US012769079B2

(12) United States Patent
Duban et al.

(10) Patent No.: US 12,769,079 B2
(45) Date of Patent: Oct. 20, 2026

(54) OPTICAL MOUNT ASSEMBLY WITH ADJUSTMENT MECHANISM HAVING A BALL BEARING

(71) Applicant: Northrop Grumman Systems Corporation, Falls Church, VA (US)

(72) Inventors: Anna M. Duban, Chicago, IL (US); Joseph P. Krause, Rolling Meadows, IL (US); Philip R. Minarik, Schaumburg, IL (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 881 days.

(21) Appl. No.: 17/994,450

(22) Filed: Nov. 28, 2022

(65) Prior Publication Data

US 2024/0176092 A1 May 30, 2024

(51) Int. Cl.

*G02B 7/00* (2021.01)
*F16M 11/12* (2006.01)
*F16M 11/18* (2006.01)
*G02B 7/182* (2021.01)

(52) U.S. Cl.

CPC ........... *G02B 7/005* (2013.01); *F16M 11/121* (2013.01); *F16M 11/18* (2013.01); *G02B 7/182* (2013.01); *G02B 7/1822* (2013.01); *G02B 7/1825* (2013.01); *G02B 7/1827* (2013.01)

(58) Field of Classification Search

CPC ...... G02B 7/005; G02B 7/182; G02B 7/1822; G02B 7/1825; G02B 7/1827; F16M 11/18; F16M 11/121

USPC ................................ 359/824, 872, 876, 877

See application file for complete search history.

(56) References Cited

U.S. PATENT DOCUMENTS 2,322,395 A * 6/1943 Sheppard ............... G02B 7/182 248/482
4,060,314 A * 11/1977 Heinz .................. G02B 7/1821 359/876
4,445,228 A * 4/1984 Bruni ........................ H04R 1/02 381/86
4,640,591 A 2/1987 Cutburth (Continued)

FOREIGN PATENT DOCUMENTS

JP 2003-273168 A 9/2003
KR 102192182 B1 12/2020
WO WO2007/123594 A1 11/2007

OTHER PUBLICATIONS

PCT ISR PCT/US2023/079959 on Mar. 26, 2024.

(Continued)

*Primary Examiner* — Jennifer D. Carruth
(74) *Attorney, Agent, or Firm* — Dority & Manning, P.A.

(57) ABSTRACT

An optical mount assembly includes a first plate configured to mount one or more optical components and a second plate arranged adjacent to the first plate and comprising a cavity formed therein. The first plate has an opening formed therein. The optical mount assembly further includes at least one adjustment mechanism secured to the first and second plates for adjusting the optical component(s). The adjustment mechanism(s) includes a ball bearing disposed within the cavity. The ball bearing defines a through hole. Further, the adjustment mechanism(s) includes an adjustment fastener extending through the opening in the first plate and at least partially within the through hole of the ball bearing.

20 Claims, 7 Drawing Sheets

(56) References Cited

U.S. PATENT DOCUMENTS

| | | | | |
|---|---|---|---|---|
| 4,681,408 | A * | 7/1987 | Ahmad | G02B 7/183 359/848 |
| 4,696,555 | A * | 9/1987 | Enomoto | B60R 1/072 359/877 |
| 4,726,671 | A * | 2/1988 | Ahmad | G02B 7/1825 359/848 |
| 4,763,991 | A | 8/1988 | Klotz, Jr. | |
| 4,946,126 | A * | 8/1990 | Williams | F16B 39/284 411/271 |
| 5,353,167 | A | 10/1994 | Kuklo et al. | |
| 5,424,872 | A * | 6/1995 | Lecuyer | G02B 27/644 359/811 |
| 5,794,541 | A | 8/1998 | Hirose | |
| 6,115,521 | A | 9/2000 | Tran et al. | |
| 6,347,458 | B1 | 2/2002 | Kaczynski | |
| 6,543,740 | B2 * | 4/2003 | Gaunt | B23Q 1/5462 248/479 |
| 6,657,361 | B1 | 12/2003 | Morales Serrano et al. | |
| 8,056,879 | B2 * | 11/2011 | Chang | G02B 7/1825 248/478 |
| 9,323,025 | B2 | 4/2016 | Heidemann et al. | |
| 9,500,836 | B2 | 11/2016 | Marr et al. | |
| RE46,564 | E | 10/2017 | Marr et al. | |
| 9,884,399 | B2 | 2/2018 | Theriault | |
| 9,906,695 | B2 | 2/2018 | Shimizu et al. | |
| 10,466,430 | B1 | 11/2019 | Krause | |
| 10,597,779 | B2 | 3/2020 | Weaver et al. | |
| 2003/0117810 | A1 * | 6/2003 | Nakazawa | B60Q 1/0683 362/273 |
| 2005/0046979 | A1 * | 3/2005 | Hiley | G02B 7/182 359/877 |
| 2012/0013999 | A1 * | 1/2012 | Thomas | G02B 7/00 359/811 |

OTHER PUBLICATIONS

Arizona Optical Metrology (AOM), DS2101: FP6 Fine Positioning Mount, 6 DoF Adjustment for C6 Precision CGH Cells, Datasheet, Jul. 19, 2021, 1 Page. www.cghnulls.com.

Thorlabs, KC1-T/M—Kinematic, SM1-Threaded, 30 mm-Cage-Compatible Mount for Ø1, Metric. Retrieved Aug. 19, 2022 from webpage https://www.thorlabs.com/thorproduct.cfm?partnumber=KCI-T/M#fad-image-0.

Wallace, Photonics Products: Mounts and Accessories: Tip/Tilt Mirror Mounts Deliver Accuracy, Stability, Laser Focus World, Software & Accessories, Nov. 4, 2014, https://www.laserfocusworld.com/software-accessories/positioning-support-accessories/article/16550105/photonics-products-mounts-and-accessories-tiptilt-mirror-mounts-deliver-accuracy-stability.

* cited by examiner

OPTICAL MOUNT ASSEMBLY WITH ADJUSTMENT MECHANISM HAVING A BALL BEARING

FIELD

The present disclosure relates generally to optical mount assemblies, and more particularly to an optical mount assembly with an adjustment mechanism having a ball bearing for aligning optical components mounted to the optical mount assembly.

BACKGROUND

Optical mounting assemblies are often used for supporting optical components that need to be precisely aligned with respect to multiple axes. Such optical components may include, for example, mirrors, lenses, lasers, fibers, focal plane arrays, etc. Optical mounting assemblies must also permit adjustment of the alignment of the optical components relative to other components in the system. Such adjustment, though typically small, is often critical to maximize overall efficiency of the optical mounting assembly. Since the optical components often require alignment with respect to multiple axes, precise adjustment of the alignment can be difficult to achieve. Moreover, precise alignment and adjustment thereof for optical components is particularly difficult to achieve if the optical components are subject to vibrations, such as those used on aircraft or spacecraft.

Some conventional adjustable mounting assemblies have relied on the use of manual adjustors for aligning optical components. Manual adjustors, however, can be cumbersome to operate and substantial time and patience is needed to achieve precise alignment. In addition, due their manual nature, conventional adjustors do not offer repeatability in achieving the desired alignment. Furthermore, manual adjustors often require overshooting a particular target to account for vibrations and/or temperature fluctuations that may cause a change to the alignment of the optical component once the component has been aligned. Thus, some degree of inaccuracy exists due to the inability to predict how vibrations and/or temperature fluctuations may change the alignment after initial alignment is set. Even further, manual adjustors generally cannot be automated because they generally rely on manual tightening with substantial force, which can have a tendency to cause the optical component to become misaligned when the force is removed. In such instances, the operator is required to alternate between adjusting and tightening to obtain the correct alignment. When the proper alignment is reached, the operator must also secure or lock the adjustor to prevent movement. However, this securement can cause further misalignment.

Thus, a need for an optical mount assembly for aligning optical components that addresses one or more of the aforementioned issues would be welcomed in the art.

BRIEF DESCRIPTION

Aspects and advantages of the present disclosure will be set forth in part in the following description, or may be obvious from the description, or may be learned through practice of the present disclosure.

In an aspect, the present disclosure is directed to an optical mount assembly. The optical mount assembly includes a first plate configured to mount one or more optical components and a second plate arranged adjacent to the first plate. The first plate includes an opening formed therein. The second plate is arranged adjacent to the first plate and comprising a cavity formed therein. The optical mount assembly also includes at least one adjustment mechanism secured to the first and second plates for adjusting the one or more optical components. The adjustment mechanism(s) includes a ball bearing disposed within the cavity. The ball bearing defines a through hole. The optical mount assembly includes an adjustment fastener extends through the opening in the first plate and at least partially within the through hole of the ball bearing.

In another aspect, the present disclosure is directed to an adjustment mechanism for aligning one or more optical components of an optical mount assembly. The adjustment mechanism includes a ball bearing defining a through hole, an adjustment fastener extending at least partially within the through hole of the ball bearing, and a motor removably coupled to the adjustment fastener. Accordingly, the motor is configured to engage the adjustment fastener to adjust the ball bearing, thereby aligning the one or more optical components.

In still another aspect, the present disclosure is directed to a method of aligning one or more optical components. The method includes mounting an optical mount assembly at a desired location, the optical mount assembly having at least one adjustment mechanism, the at least one adjustment mechanism having a ball bearing, an adjustment fastener engaged with the ball bearing, and a motor engaged with the adjustment fastener. The method also includes manipulating the at least one adjustment mechanism to align the one or more optical components. In particular, manipulating the at least one adjustment mechanism includes engaging the adjustment fastener via the motor to adjust the ball bearing, thereby aligning the one or more optical components.

These and other features, aspects and advantages of the present disclosure will be further supported and described with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
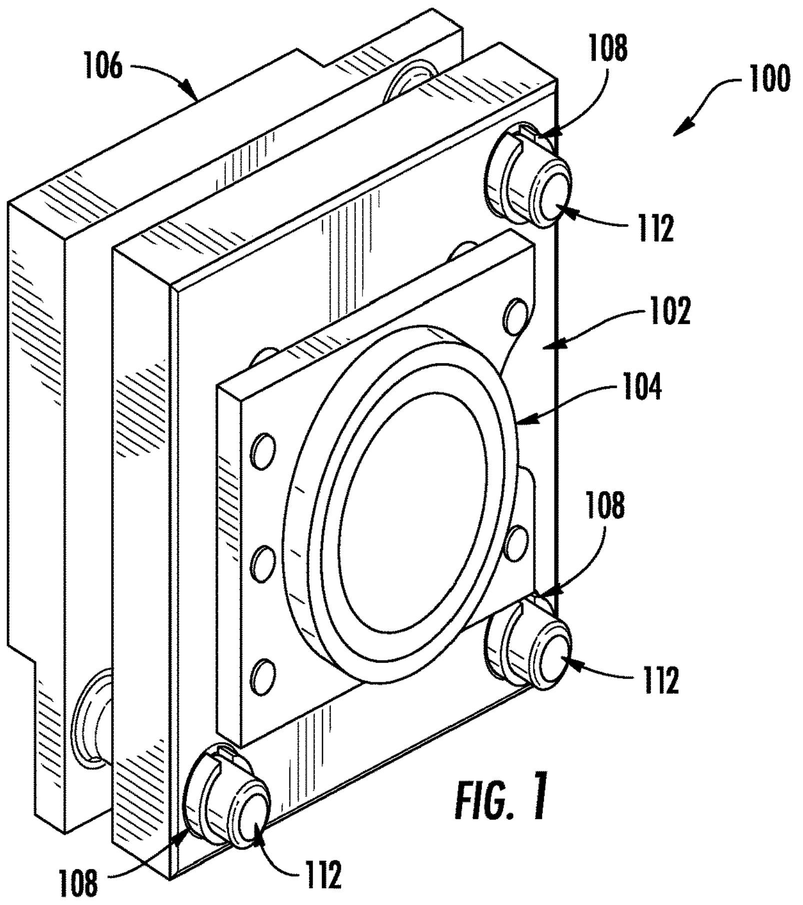
FIG. 1 illustrates a perspective view of an embodiment of an optical mount assembly for mounting and aligning one or more optical components according to the present disclosure.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents. Certain conventional optical mounting systems incorporate manual adjustors for aligning optical components. These manual adjustors, however, can be cumbersome to operate. In addition, manual adjustors generally involve a time-consuming process to achieve precise alignment. Moreover, due to their manual nature, conventional adjustors do not offer repeatability in achieving the desired alignment. In particular, manual adjustors often require overshooting a particular target to account for vibrations and/or temperature fluctuations that may cause a change to the alignment of the optical component once the component is aligned. Therefore, some degree of inaccuracy is present due to the inability to predict how vibrations and/or temperature fluctuations may change the alignment. Even further, manual adjustors generally cannot be automated because the adjustors generally rely on manual tightening with substantial force, which can cause the optical component to become misaligned. In such instances, an operator is required to alternate between adjusting and tightening to obtain the correct alignment. When the proper alignment is reached, the operator must also secure or lock the adjustor to prevent movement. However, this securement can cause further misalignment.

Accordingly, the present disclosure is directed to an optical mount assembly with an adjustment mechanism having a ball bearing for aligning optical components thereof. In particular embodiments, the optical mount assembly includes at least one adjustment mechanism, such as a ball joint. For example, in certain embodiments, each adjustment mechanism includes a ball bearing secured to an adjustment fastener, such as 100 thread-per-inch adjustment screw with a hex head end. Thus, the hex head end can be actuated by a motor, such as a stepper motor. In such embodiments, the adjustment mechanism(s), particularly the ball bearing(s), provide the required tip/tilt range of motion, whereas the resolution of the adjustment fastener provides the fine movement required to precisely align the optical components. After the optical mount assembly is aligned, the adjustment mechanism(s) can be further secured with an adhesive or via welding, and the motor(s) removed for flight.

Figure 2:
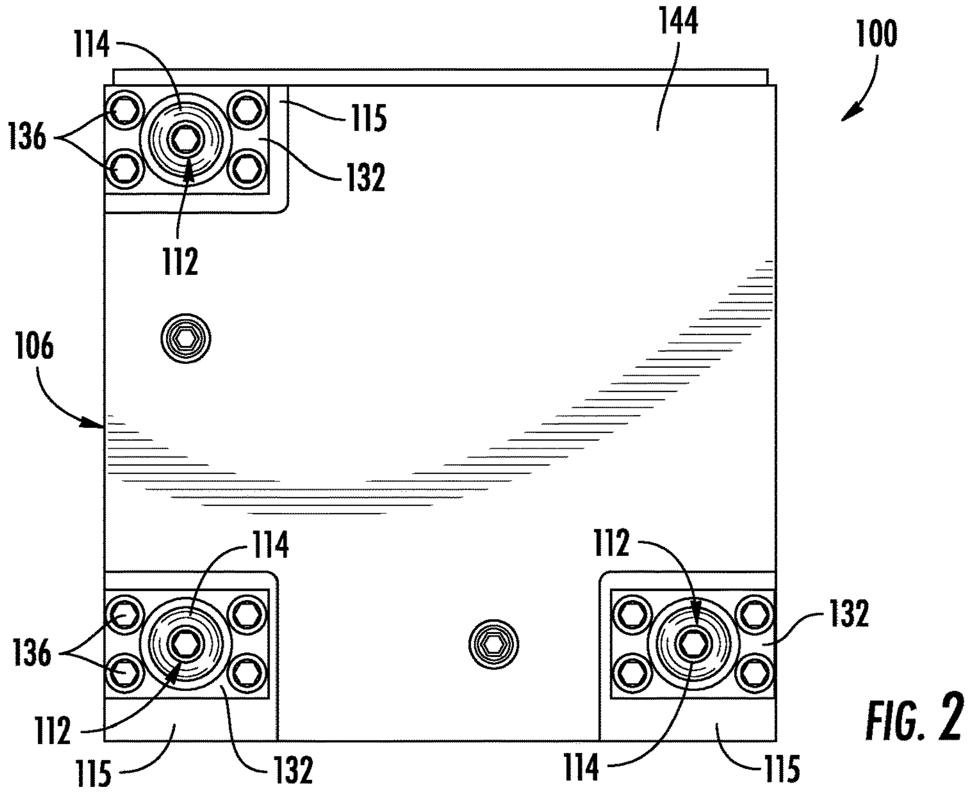
FIG. 2 illustrates a rear view of the optical mount assembly shown in FIG. 1.
Figure 3:
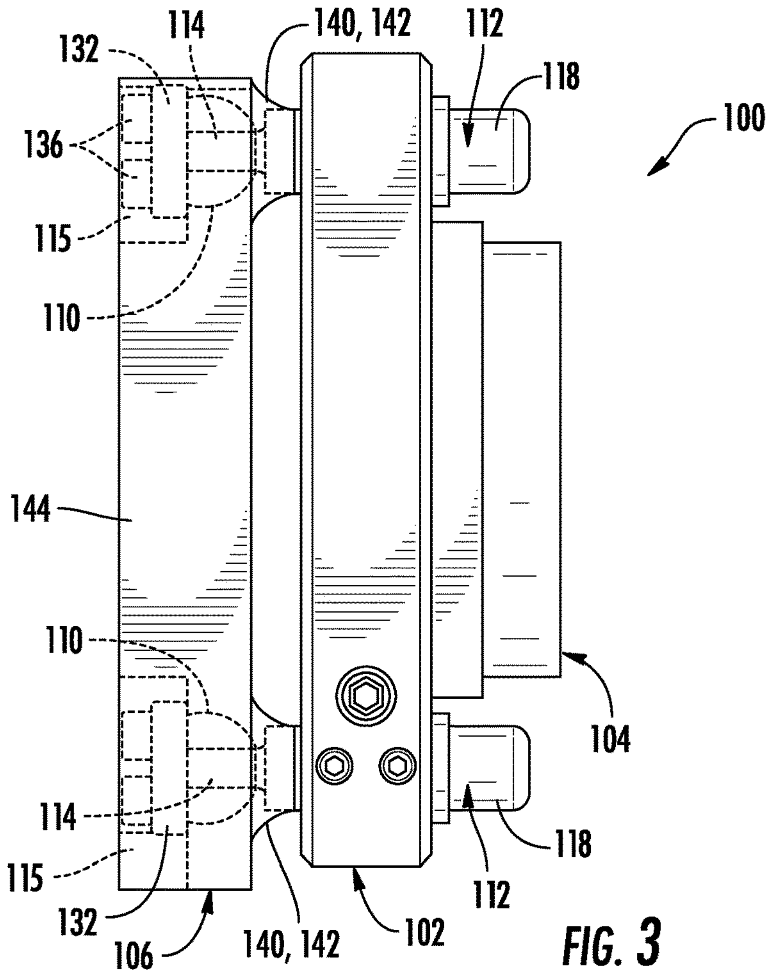
FIG. 3 illustrates a side view of the optical mount assembly shown in FIG. 1.
Figure 4:
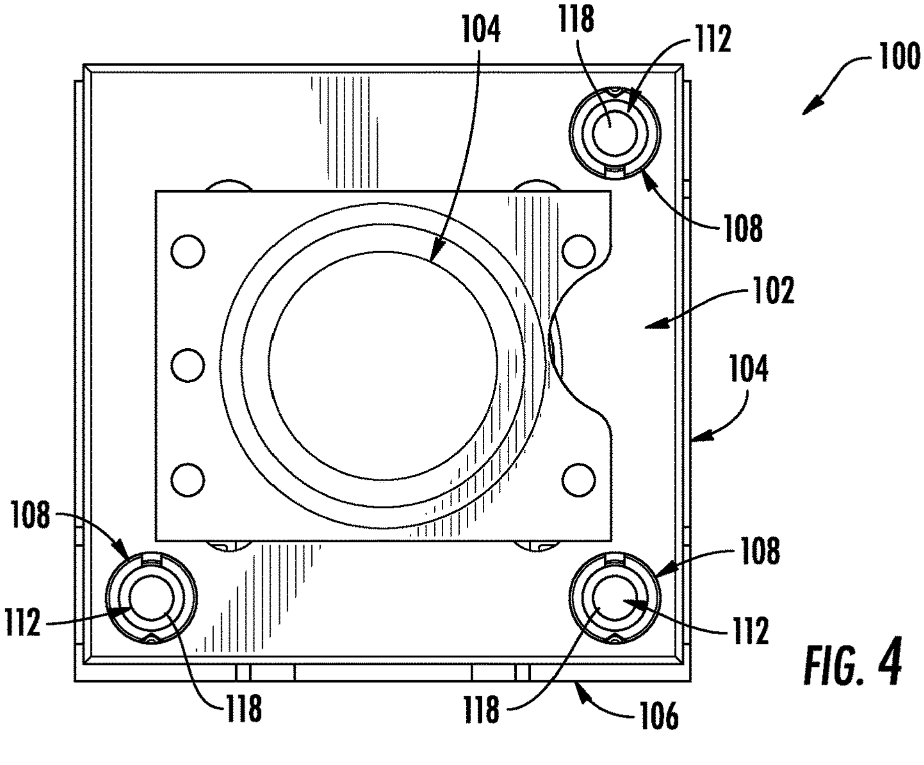
FIG. 4 illustrates a front view of the optical mount assembly shown in FIG. 1.
Figure 5:
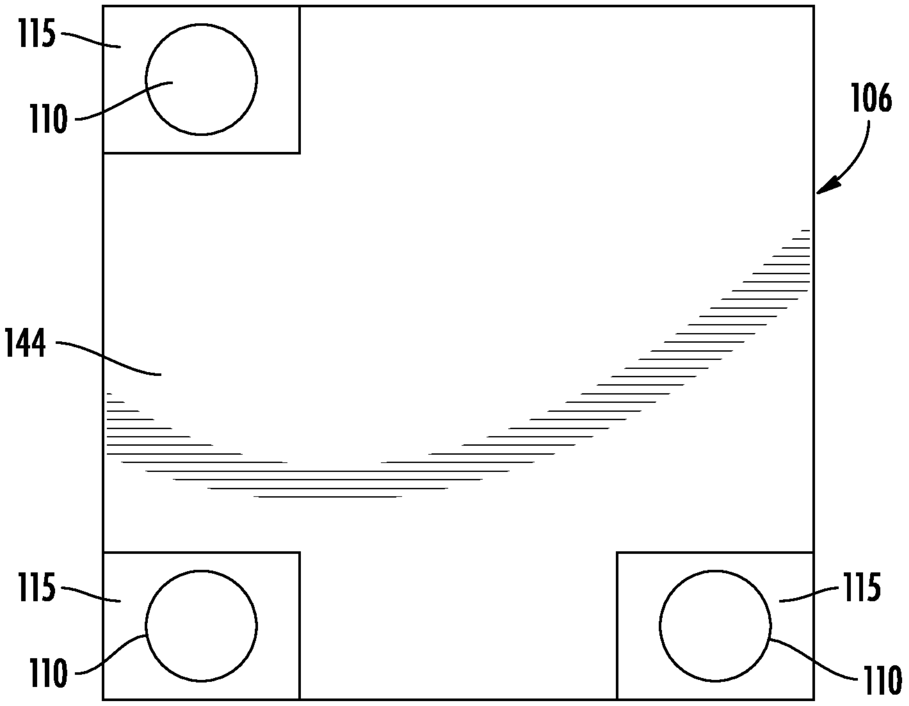
FIG. 5 illustrates a front view of a second plate of an optical mount assembly according to the present disclosure, particularly illustrating a plurality of openings positioned with a plurality of recesses in the second plate.

Referring now to the drawings, FIGS. 1-4 illustrate various views of an embodiment of an optical mount assembly 100 for mounting and aligning one or more optical components 104 according to the present disclosure. In particular, FIG. 1 illustrates a perspective view of an embodiment of the optical mount assembly 100 according to the present disclosure; FIG. 2 illustrates a rear view of the optical mount assembly 100 shown in FIG. 1; FIG. 3 illustrates a side view of the optical mount assembly 100 shown in FIG. 1; and FIG. 4 illustrates a front view of the optical mount assembly 100 shown in FIG. 1.

Accordingly, as shown generally in FIGS. 1-4, the optical mount assembly 100 includes a first plate 102 configured to mount one or more optical components 104. For example, in certain embodiments, the optical component(s) 104 described herein may include mirrors, lenses, lasers, fibers, focal plane arrays, etc. Furthermore, as shown in FIGS. 1 and 4, the first plate 102 includes at least one opening 108 formed therein. In particular embodiments, for example, the opening 108 of the first plate 102 may be a threaded opening. Moreover, as shown, the first plate 102 includes three openings 108. However, in further embodiments, it should be understood that the first plate 102 may include less than three or more than three openings 108.

Referring particularly to FIGS. 1-3, the optical mount assembly 100 further includes a second plate 106 arranged adjacent to the first plate 102. Furthermore, as shown particularly in FIG. 3, the second plate 106 includes at least one cavity 110 formed therein. In particular embodiments, as shown, the second plate 106 includes three cavities 110. However, in further embodiments, it should be understood that the second plate 106 may include less than three or more than three cavities 110. Furthermore, in an embodiment, the number of cavities 110 may generally be equal to the number of openings 108 in the first plate 102. In addition, as shown in FIGS. 2, 3, 5, and 9, the second plate 106 may further include one or more recesses 115 formed in a rear side 144 thereof.

Figure 9:
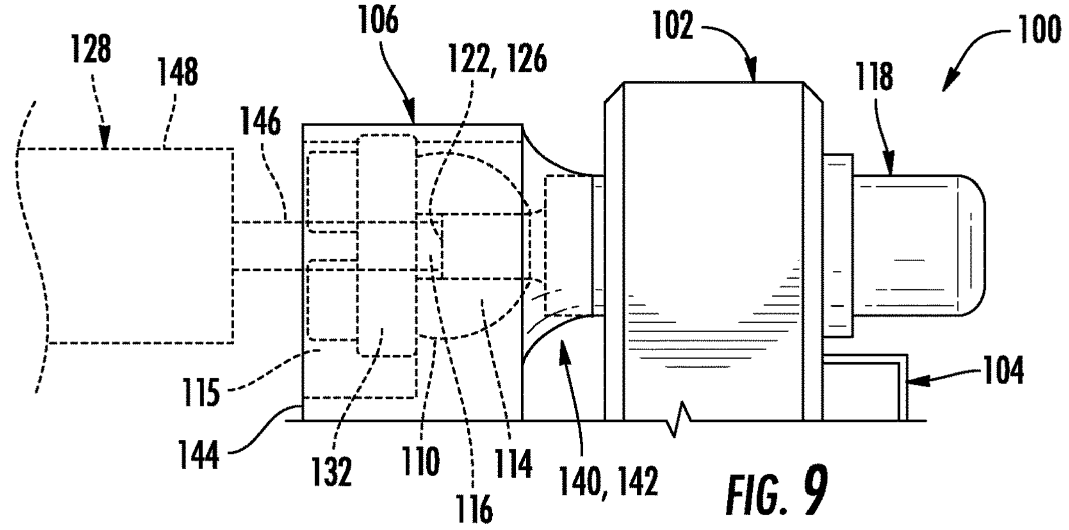
FIG. 9 illustrates a partial, side view of an embodiment of an optical mount assembly according to the present disclosure, particularly illustrating an internal view of an adjustment mechanism of the optical mount assembly having a ball bearing and an adjustment fastener.

In further embodiments, as shown in FIGS. 2, 3, 6, and 9, the optical mount assembly 100 may further include at least one cap 132 arranged with and adjacent to the cavity 110 of the second plate 106, e.g., within the recess(es) 115. Accordingly, in an embodiment, as shown in FIGS. 3 and 9, the recess(es) 115 allow the cap(s) 132 to sit generally flush within the second plate 106 when secured thereto. This flush configuration provides a generally flat surface, which, as described herein below in more detail, is useful for mounting a motor mount 130 of the optical mount assembly 100.

In additional embodiments, the first and second plates 102, 106 may have any suitable shape and/or size and may be formed of any suitable material to accommodate the optical component(s) 104 described herein. In particular embodiments, as shown, the first and second plates 102, 106 may each have a generally corresponding shape (i.e., a matching shape), such as a square shape. Moreover, in an embodiment, the first and second plates 102, 106 may be constructed of a metal material, such as aluminum, titanium, or steel.

Figure 7:
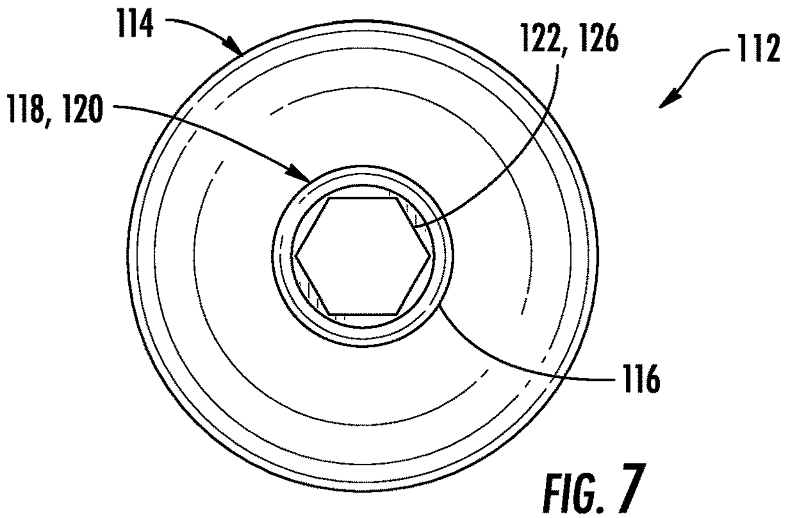
FIG. 7 illustrates an end view of an embodiment of an adjustment mechanism of an optical mount assembly according to the present disclosure, particularly illustrating a ball bearing and an adjustment fastener of the adjustment mechanism.
Figure 8:
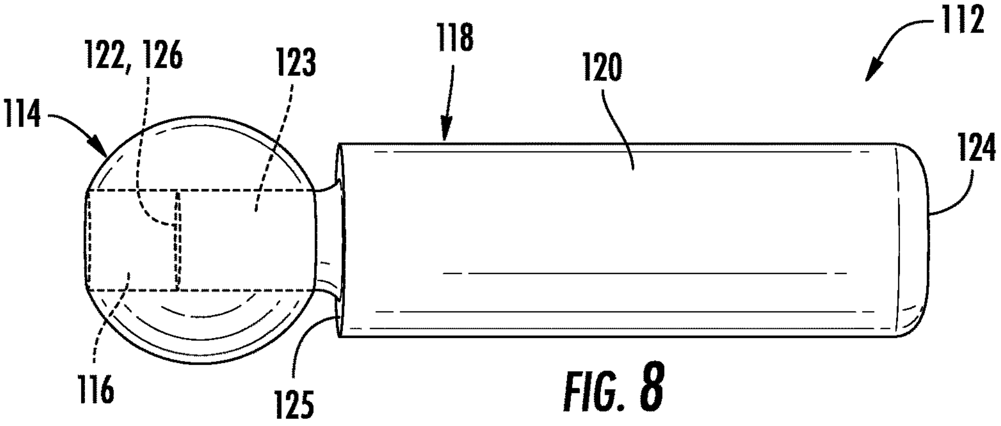
FIG. 8 illustrates a side view of an embodiment of an adjustment mechanism of an optical mount assembly according to the present disclosure, particularly illustrating a ball bearing and an adjustment fastener of the adjustment mechanism.

Referring now generally to FIGS. 1-4 and 7-10, the optical mount assembly 100 further includes at least one adjustment mechanism 112 secured to the first and second plates 102, 106. In particular, FIGS. 1-4 and 9 illustrate the adjustment mechanism(s) 112 arranged as a part of the optical mount assembly 100, whereas FIGS. 7 and 8 illustrate end and side views, respectively, of an embodiment of the adjustment mechanism 112 according to the present disclosure.

In particular embodiments, as shown, the optical mount assembly 100 may include a plurality of adjustment mechanisms 112, such as three adjustment mechanisms 112. However, in further embodiments, it should be understood that the optical mount assembly 100 may include less than three or more than three adjustment mechanisms 112. In such embodiments, the number of adjustment mechanisms 112 corresponds to the number of degrees of freedom of the optical mount assembly 100. Accordingly, in the illustrated embodiment, the three adjustment mechanisms 112 provide the optical mount assembly 100 with three (3) degrees of freedom. In further embodiments, the optical mount assembly 100 may have any number of degrees of freedom greater than one. Thus, in an embodiment, the adjustment mechanisms 112 are configured to adjust the optical component(s) 104 mounted thereon about multiple axes.

Accordingly, as shown in the illustrated embodiments of FIGS. 2, 3, and 7-9, each of the adjustment mechanism(s) 112 includes a ball bearing 114. In such embodiments, the ball bearing(s) 114 may be hardened stainless steel ball bearings. Furthermore, as shown in FIGS. 2-3 and 9, the ball bearing(s) 114 are sized to be disposed within one of the caps 132 within a respective cavity 110 of the second plate 106. In addition, as shown in FIGS. 7-9, the ball bearing 114 includes a through hole 116 formed therein. In certain embodiments, the through hole 116 of the ball bearing 114 may be threaded. Alternatively, the through hole 116 of the ball bearing 114 may be absent of threads.

Figure 6:
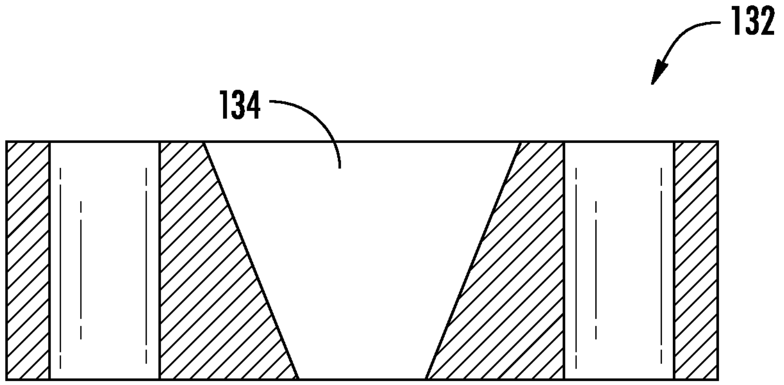
FIG. 6 illustrates a cap of an optical mount assembly according to the present disclosure.

Accordingly, as shown in FIG. 6, the cap 132 of the optical mount assembly 100 may generally include an aperture 134 having a shape that matches a curvature of the ball bearing 114. For example, as shown in FIG. 6, the aperture 134 of the cap 132 may have a conical configuration or depression. Accordingly, the aperture 134 of the cap 132 is configured to seat the ball bearing 114 therein. As such, during aligning of the optical component(s), the ball bearing(s) 114 is configured to freely pivot within the aperture 134 to obtain the proper alignment. After alignment, the cap 132 can be tightened against the second plate 106 within the recess(s) 115. Thus, when tightened, the cap 132 is configured to compress the ball bearing 114 to secure the ball bearing 114 in place, thereby maintaining alignment of the optical component(s) 104. For example, as shown particularly in FIGS. 2 and 3, the cap 132 may be tightened against the second plate 106 using one or more fasteners 136 (such as bolts, screws, etc.). In particular embodiments, as shown in FIG. 2, the cap(s) 132 may be secured within the recess(es) 115 of the second plate 106 using four of the fasteners 136, e.g., with two fasteners 136 on each side of the ball bearing 114.

Referring now particularly in FIGS. 7-9, the adjustment mechanism 112 further includes an adjustment fastener 118 secured to the ball bearing 114. Thus, as shown in FIGS. 1, 3-4, and 9, the adjustment fastener 118 is configured to extend through the opening 108 in the first plate 102 and within the through hole 116 of the ball bearing 114 (see e.g., FIGS. 7-9). More specifically, in certain embodiments, as shown particularly in FIG. 8, the adjustment fastener 118 may include a first portion 120 and a second portion 123, with the first portion 120 having a larger diameter than the second portion 123. Further, in certain embodiments, at least a portion of the adjustment fastener 118 may be a threaded fastener. In such embodiments, the adjustment fastener 118 may include any suitable number of threads that are capable of providing the desired adjustment of the optical component(s) 104, which generally requires fine or ultra-fine adjustment. As such, in an embodiment, the adjustment fastener 118 may include from about 40 threads per inch (TPI) to about 100 TPI and greater.

Accordingly, by firmly compressing the ball bearing 114 via the cap 132, the optical component(s) 104 are secured in place by limiting rotation of the adjustment fastener 118. Such securement is also configured to eliminate pivoting of a motor(s) 128 described herein below, which further aids in stability of the optical mount assembly 100. In further embodiments, additional securement means may be further added to increase stability, such as by adding one or more fasteners (e.g., jam nuts) to further secure the adjustment fastener 118 in place. Thus, in particular embodiments, the ball bearing(s) 114 is configured to provide a desired tip/tilt range of motion and the resolution of the adjustment fastener (s) 118 is configured to provide the fine movement required to precisely align the optical component(s) 104.

Furthermore, in particular embodiments, the first portion 120 of the adjustment fastener 118 may be threaded, whereas the second portion 123 may be absent of threads. Thus, in such embodiments, the threaded first portion 120 may be threaded through the threaded opening 108 of the first plate 102, whereas the smaller, second portion 123 without threads may be press fit within the through hole 116 of the ball bearing 114.

In further embodiments, however, the entire adjustment fastener 118 may be threaded, with the second portion 123 being optionally threaded into the through hole 116 of the ball bearing 114 rather than being press fit. In still another embodiment, the larger diameter of the first portion 120 of the adjustment fastener 118 may also provide a stop 125 (see e.g., FIG. 8) such that only the second portion 123 of the adjustment fastener 118 can be inserted into the through hole 116 of the ball bearing 114. However, in additional embodiments, it should be understood that the adjustment fastener 118 may have a constant diameter along an axial length of the adjustment fastener 118, e.g., from a first end 122 to a second end 124 thereof.

More particularly, in an embodiment, as shown particularly in FIG. 8, the axial length of the adjustment fastener 118 is defined between the first end 122 and the second end 124. In one embodiment, as shown in FIGS. 7-9, the first end 122 extends within the through hole 116 of the ball bearing 114 and may generally have a hexagon head 126. In further embodiments, the first end 122 may have any other suitably shaped head having any number of sides that can be easily engaged with a motor, as described herein below. Moreover, as shown particularly in FIGS. 3 and 9, the second end 124 of the adjustment fastener 118 may extend beyond the first plate 102. In other embodiments, the second end 124 of the adjustment fastener 118 may be flush with or recessed within the first plate 102.

Figure 10:
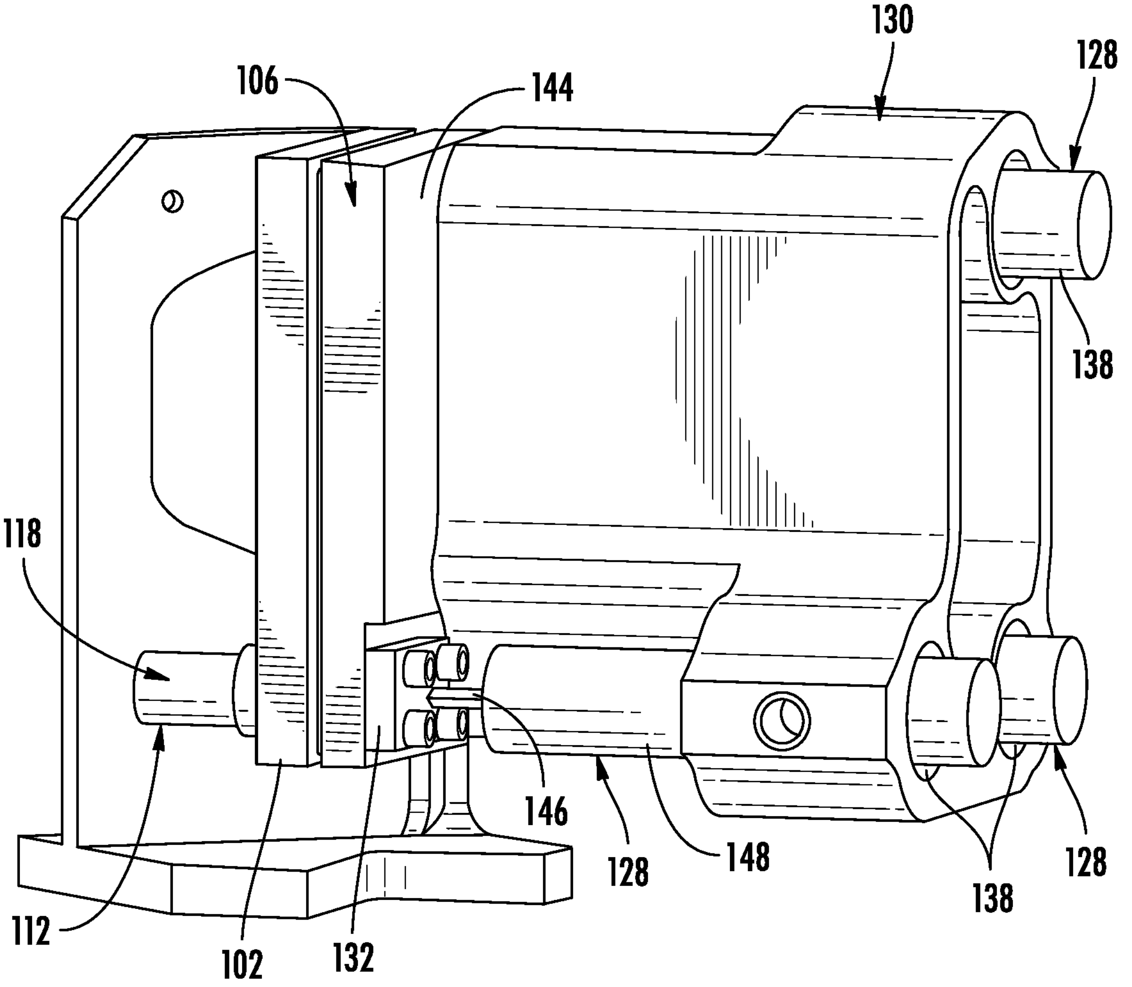
FIG. 10 illustrates a perspective view of an embodiment of a motor mount secured to an optical mount assembly according to the present disclosure.

Referring now particularly to FIGS. 9 and 10, the optical mount assembly 100 may also include at least one motor 128 removably coupled to the adjustment fastener 118. For example, in an embodiment, the motor(s) 128 may be a stepper motor with a flexible drive shaft 146 that extends from a motor body 148 to the adjustment fastener 118. As used herein, a stepper motor generally refers to an electric motor, such as a brushless direct current (DC) electric motor, that divides a full rotation into equal steps. In further embodiments, the motor(s) 128 may be any other suitable type of motor that can engage the adjustment fastener 118 to adjust or move the ball bearing 114 as described herein. Accordingly, in an embodiment, as shown, the motor(s) 128 is configured to engage the adjustment fastener 118 to adjust or move the ball bearing 114, thereby aligning the optical component(s) 104 described herein.

Referring particularly to FIG. 10, the optical mount assembly 100 may further include a motor mount 130 configured to secure a plurality of motors 128 in place with respect to the optical mount assembly 100. Thus, as shown in the illustrated embodiment, the motor mount 130 may include one or more mounts or holes 138 for receiving each of the motors 128 therethrough. In particular embodiments, as shown, the motor mount 130 may have three holes 138 to receive three separate motors 128, i.e., one for each of the adjustment mechanisms 112. In further embodiments, the motor mount 130 may have more than three or less than three holes 138.

Furthermore, as shown, the motor mount 130, by being removably mounted on a side of the second plate 106 opposite the first plate 102 (such as the rear side 144), is configured to align each of the motors 128 with a respective alignment mechanism 112 of the optical mount assembly 100. As such, the motors 128 are configured to easily engage the adjustment fasteners 118 of the alignment mechanism 112 (e.g., the hexagon heads 126 of the first ends 122 of the adjustment fasteners 118). In certain embodiments, the motors 128 may engage the adjustment fasteners 118 of the alignment mechanism 112 automatically, such as by being controlled via a controller 150 (see e.g., FIG. 12). Once the motors 128 engage the adjustment fasteners 118 to move/adjust the ball bearings 114 within the caps 132 so as to align the optical component(s) 104, the motor mount 130, along with the motors 128, can be removed from the optical mount assembly 100.

In additional embodiments, and referring particularly to FIGS. 3 and 9, the optical mount assembly 100 may also include a locking mechanism 140 for securing the ball bearing 114 within the cap 132, thereby locking the optical component(s) 104 in place after aligning. For example, in the illustrated embodiment, the locking mechanism 140 may be formed via an adhesive 142 or epoxy applied and cured to portions of the adjustment fastener 118 and the second plate 106. In further embodiments, the locking mechanism 140 may be formed using laser welding. In particular embodiments, for example, the motor mount 130 and corresponding motors 128 may be removed from the optical mount assembly 100 after the optical mount assembly 100 has been secured with the locking mechanism 140 (shown in FIGS. 3 and 9).

Figure 11:
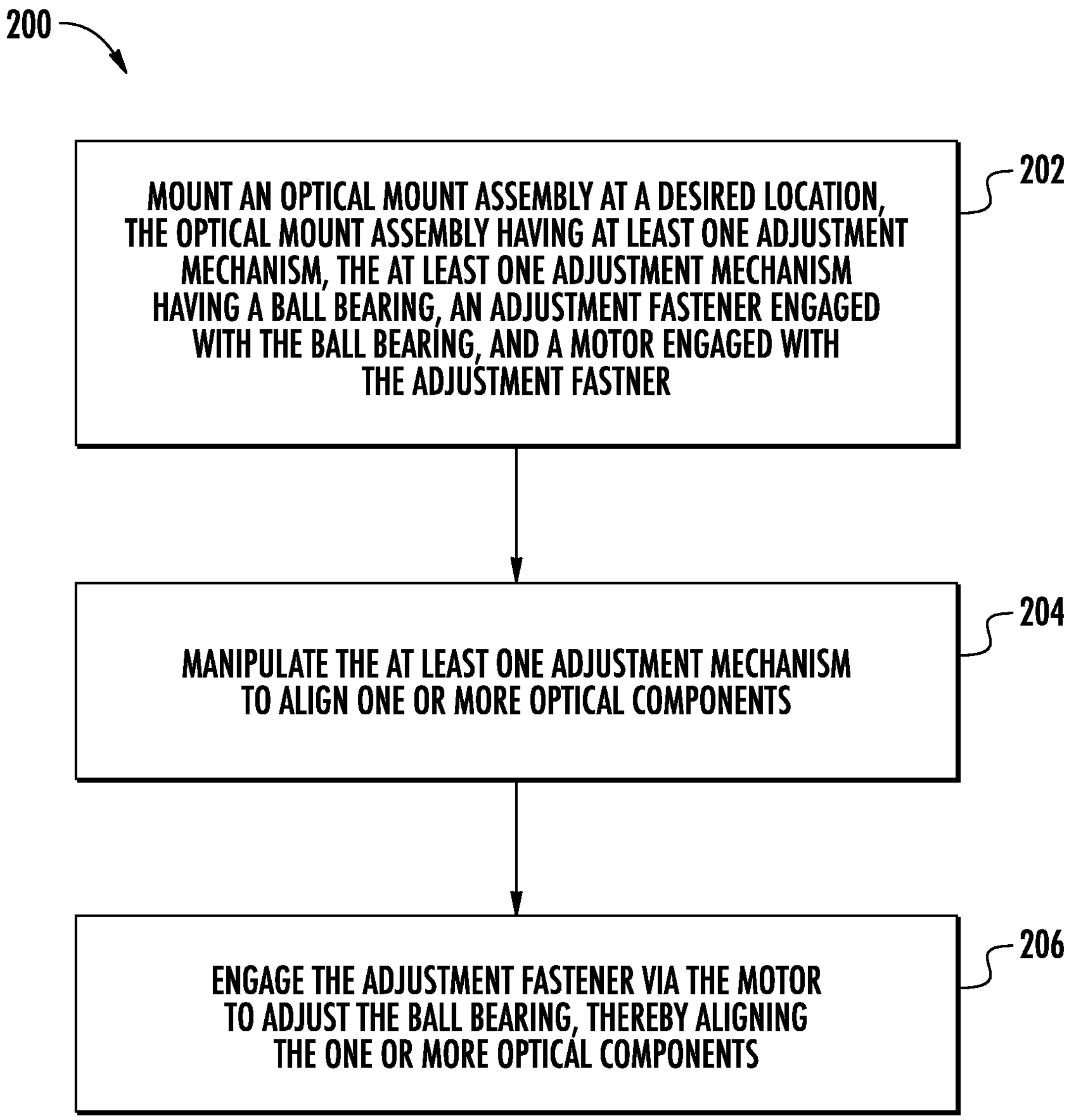
FIG. 11 illustrates a flow diagram of an embodiment of a method of aligning one or more optical components according to the present disclosure.

Referring now to FIG. 11, a flow diagram of an embodiment of a method 200 of aligning one or more optical components according to the present disclosure is illustrated. In general, the method 200 will be described herein with reference to the optical mount assembly 10 illustrated in FIGS. 1-10. However, it should be appreciated that the disclosed method 200 may be implemented with optical mount assemblies having any other suitable configurations. In addition, although FIG. 11 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 may include mounting an optical mount assembly at a desired location. As described herein, the optical mount assembly 100 generally includes at least one adjustment mechanism 112 having a ball bearing 114, an adjustment fastener 118 engaged with the ball bearing 114, and a motor 128 engaged with the adjustment fastener 118. Thus, as shown at (204), the method 200 may include manipulating the adjustment mechanism(s) 112 to align the optical component(s) 104. In particular embodiments, as shown at (206), manipulating the adjustment mechanism(s) 112 to align the optical component (s) 104 may include engaging the adjustment fastener 118 via the motor 128 to adjust the ball bearing 114, thereby aligning the optical component(s) 104.

Figure 12:
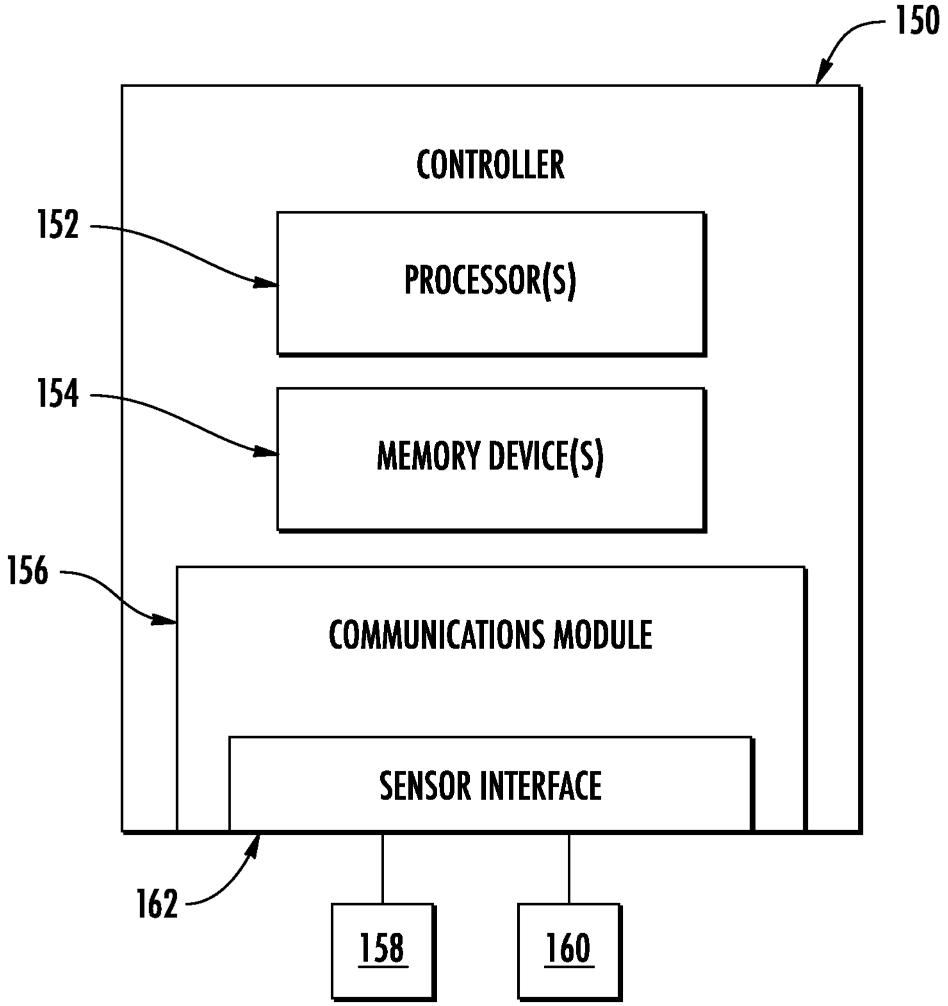
FIG. 12 illustrates a block diagram of components that may be included with a controller of an optical mount assembly according to the present disclosure.

Referring now to FIG. 12, a block diagram of components that may be included with the controller 150 according to the present disclosure is illustrated. In particular, as shown, the controller 150 may include one or more processors 152 and one or more memory devices 154 configured to perform a variety of computer-implemented functions (e.g., performing the methods, steps, calculations and the like and storing relevant data as disclosed herein). Additionally, the controller 150 may also include a communications module 156 to facilitate communications between the controller 150 and various sensor(s) 158, 160. Further, as shown, the communications module 156 may include a sensor interface 162 (e.g., one or more analog-to-digital converters) to permit signals transmitted from the sensor(s) 158, 160 to be converted into signals that can be understood and processed by the processor(s) 152. For example, the sensors(s) 158, 160 may be placed in and around the optical mount assembly 100 for sensing a position of the ball bearing(s) 114 and generating corresponding signals. Such signals may be received and analyzed by the processor(s) 152 for determining proper alignment of the optical component(s) 104 of the optical mount assembly 100.

It should be appreciated that the sensor(s) 158, 160 may be communicatively coupled to the communications module 156 using any suitable means. For example, as shown in FIG. 12, the sensor(s) 158, 160 may be coupled to the sensor interface 162 via a wired connection. However, in other embodiments, the sensor(s) 158, 160 may be coupled to the sensor interface 158 via a wireless connection, such as by using any suitable wireless communications protocol known in the art. As such, the processor(s) 152 may be configured to receive one or more signals from the sensor(s) 158, 160. Further, the controller 150 and the sensor(s) 158, 160 may also be an integrated packaged product.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor(s) 152 may also be configured to compute advanced control algorithms and communicate to a variety of Ethernet or serial-based protocols (Modbus, OPC, CAN, etc.) as well as classical analog or digital signals. Additionally, the memory device(s) 154 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 154 may generally be configured to store suitable computer-readable instructions that, when implemented by the processor(s) 152, configure the controller 150 to perform the various functions as described herein.

In additional embodiments, the sensor(s) 158, 160 described herein may include any one of or combination of the following sensors: a proximity sensor, an optical sensor, a pressure sensor, an electrical sensor, an accelerometer, or similar.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An optical mount assembly, comprising:
- a first plate configured to mount one or more optical components, the first plate comprising an opening formed therein;
- a second plate arranged adjacent to the first plate and comprising a cavity formed therein; and
- at least one adjustment mechanism secured to the first and second plates for adjusting the one or more optical components, the at least one adjustment mechanism comprising:
  - a ball bearing disposed within the cavity, the ball bearing defining a through hole;
  - an adjustment fastener extending through the opening in the first plate and at least partially within the through hole of the ball bearing, the adjustment fastener comprising a first end and a second end, the first end extending within the through hole of the ball bearing and comprising a head; and
  - a motor removably coupled to the adjustment fastener, the motor configured to engage the head of the adjustment fastener to adjust the ball bearing to align the one or more optical components.

2. The optical mount assembly of claim 1, further comprising:
- a motor mount configured to removably mount on a side of the second plate opposite the first plate, the motor mount configured to secure the motor in place to engage the head of the first end of the adjustment fastener through the ball bearing.

3. The optical mount assembly of claim 1, wherein the motor comprises a stepper motor.

4. The optical mount assembly of claim 1, wherein the opening of the first plate is a threaded opening and at least a portion of the adjustment fastener is a threaded fastener, the threaded fastener being threaded through the threaded opening.

5. The optical mount assembly of claim 1, further comprising:
- a cap arranged with the ball bearing, the cap comprising an aperture having a shape that matches a curvature of the ball bearing.

6. The optical mount assembly of claim 5, wherein, when tightened, the cap is configured to compress the ball bearing to secure the ball bearing in place within the cavity.

7. The optical mount assembly of claim 6, wherein the aperture of the cap has a conical configuration.

8. The optical mount assembly of claim 6, further comprising:
- a locking mechanism for securing the ball bearing within the aperture of the cap, thereby locking the one or more optical components in place after aligning.

9. The optical mount assembly of claim 8, wherein the locking mechanism is formed via at least one of an adhesive or laser welding.

10. The optical mount assembly of claim 1, wherein at least a portion of the adjustment fastener is press fit within the through hole of the ball bearing.

11. The optical mount assembly of claim 1, wherein the at least one adjustment mechanism comprises the plurality of adjustment mechanisms, wherein a number of the plurality of adjustment mechanisms corresponds to a number of degrees of freedom of the optical mount assembly.

12. The optical mount assembly of claim 1, wherein the head comprises a hexagon head.

13. An adjustment mechanism for aligning one or more optical components of an optical mount assembly, the adjustment mechanism comprising:
- a ball bearing defining a through hole;
- an adjustment fastener extending at least partially within the through hole of the ball bearing, the adjustment fastener comprising a first end and a second end, the first end extending within the through hole of the ball bearing and comprising a head; and
- a motor removably coupled to the adjustment fastener,
- wherein the motor is configured to engage the head of the adjustment fastener to adjust the ball bearing, aligning the one or more optical components.

14. A method of aligning one or more optical components, the method comprising:
- mounting an optical mount assembly at a desired location, the optical mount assembly having at least one adjustment mechanism, the at least one adjustment mechanism having a ball bearing and an adjustment fastener engaged with the ball bearing, the adjustment fastener comprising a first end and a second end, the first end extending within the through hole of the ball bearing and comprising a head, the at least one adjustment mechanism further having a motor engaged with the head of the adjustment fastener; and
- manipulating the at least one adjustment mechanism to align the one or more optical components, wherein manipulating the at least one adjustment mechanism comprises:
  - operating the motor to engage the head of the adjustment fastener to adjust the ball bearing, aligning the one or more optical components.

15. The method of claim 14, wherein the optical mount assembly further comprises a first plate with the one or more optical components mounted thereon, a second plate arranged adjacent to the first plate and having a cavity formed therein, and a cap arranged adjacent to the cavity, the at least one adjustment mechanism secured to the first and second plates, the cap comprising an aperture having a shape that matches a curvature of the ball bearing, the method further comprising:
- tightening the cap to compress the ball bearing to secure the ball bearing in place within the cavity.

16. The method of claim 15, further comprising securing the ball bearing in place after aligning the one or more optical components via at least one of an adhesive or laser welding.

17. The method of claim 15, further comprising:

mounting a motor mount on a side of the second plate opposite the first plate, the motor mount securing the motor in place to engage an end of the adjustment fastener through the ball bearing.

18. The method of claim 17, further comprising:

removing the motor mount from the optical mount assembly after aligning the one or more optical components.

19. The method of claim 14, further comprising:

manipulating the at least one adjustment mechanism to align the one or more optical components automatically.

20. The adjustment mechanism of claim 13, wherein the head comprises a hexagon head.

* * * * *